Patented Sept. 6, 1927.

1,641,611

UNITED STATES PATENT OFFICE.

MORGAN K. ARMSTRONG, OF WINNETKA, ILLINOIS, ASSIGNOR, BY MESNE ASSIGNMENTS, TO UNITED STATES GYPSUM COMPANY.

NAIL-PENETRABLE WALL BOARD. REISSUED

No Drawing. Application filed April 29, 1920, Serial No. 377,421. Renewed March 4, 1927.

This invention relates to an improved plastic mixture and consists of the matters hereinafter described and more particularly pointed out in the appended claims.

The object of the invention is to produce a novel and useful plastic mixture, more particularly adapted for use as a body or filler for plaster wall boards, for molded forms and the like.

The plastic mixture is of the kind described in Letters Patent, No. 1,331,554 granted to me February 24, 1920, and includes as its main ingredient a full clay or soil containing a comparatively large proportion of clay.

The clay or soil is deflocculated as in my earlier patent, first mixing it with water in a suitable receptacle and then subjecting it to the action of an electrolyte, as sodium phosphate. The electrolyte is added in an amount sufficient to precipitate the greater part of the soluble constituents of the clay, the amount varying with different clays and being determined by experiment.

After or during the process of deflocculation, a very small percentage (one-half to three-fourths of one percent) of some organic colloid such as starch or dextrine, is added and thoroughly dissolved in the mixture.

To the processed clay, I then add, in a liquid state and either cold or hot, bitumen, asphalt, coal tar or other like water-proofing material. The amount of water-proofing material added to the processed clay should preferably approximate the volume of water added to the clay in the process of deflocculation. The water-proofing material is thoroughly incorporated with the treated clay.

The product thus made may be produced in large quantities and may be placed in suitable receptacles to be kept on hand, ready for use when needed, to make the improved plastic mix.

When desired for use in a plastic mix for making plaster board, molded products, or the like, finely ground calcined gypsum is added to the clay mix or slurry containing the bituminous substance, and the two are thoroughly mixed together. The plastic mix is then ready for immediate use, as for example, on a machine for making plaster board or for use in making molded forms and the like.

The amount of calcined gypsum added depends on the purpose for which the plastic mix is to be used. In the case of the use of the plastic mix in making plaster board, the proportions of the clay mix and of the calcined gypsum are 40% of gypsum and 60% of the clay mix.

The combined water of the hydrates of the clay mix, as well as the water added in the process of deflocculation, provide the water for hydrating the gypsum when the plastic mix is being used for any of its intended purposes.

The bitumen, asphalt, coal tar or like water-proofing content of the plastic mix not only acts to make the plaster body impervious to the action of water, or to make it waterproof, but in addition it adds greatly to the tensile and compressive strength of the mixture when dry. Thus when the mixture is used for making board for example, the increased strength of the mixture greatly increases the resistance of the board to bending, shearing or other breaking strains. Again, the particles of plaster possess greatly increased adherence, so that a nail driven through the plaster, as when nailing a board made of the plaster to studding, will not break the plaster. The new plaster is thus an efficient nailing mixture.

I claim as my invention:—

1. A rigid, waterproof, nail penetrable wallboard comprising a plastic mix of deflocculated clay, a bituminous material, and calcined gypsum in such proportions that the product has the properties specified.

2. A rigid, nail penetrable wallboard comprising a plastic mixture of a large percentage of calcined gypsum, water and bitumen, said bitumen having been emulsified to render it miscible with water by an emulsifying agent such as deflocculated clay.

In testimony that I claim the foregoing as my invention, I affix my signature this 27th day of April, A. D. 1920.

MORGAN K. ARMSTRONG.